A. E. TANNER & E. A. CLAREMONT.
ALTERNATING CURRENT CABLE DISTRIBUTING SYSTEM.
APPLICATION FILED APR. 8, 1910.
1,050,250. Patented Jan. 14, 1913.
Fig. 1,
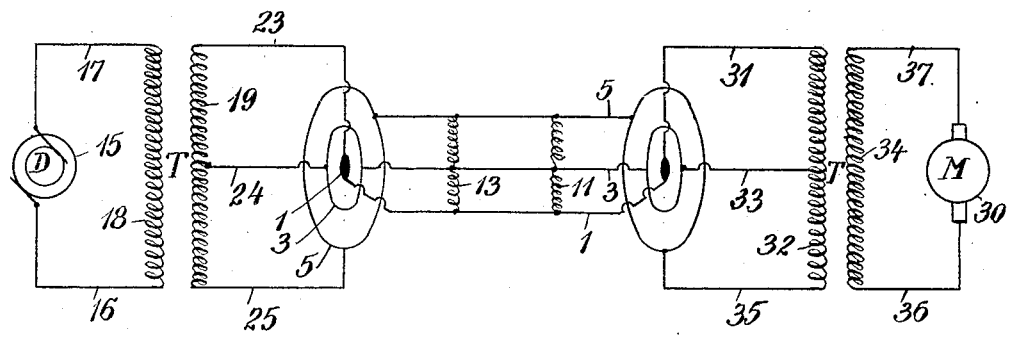
Fig. 2,
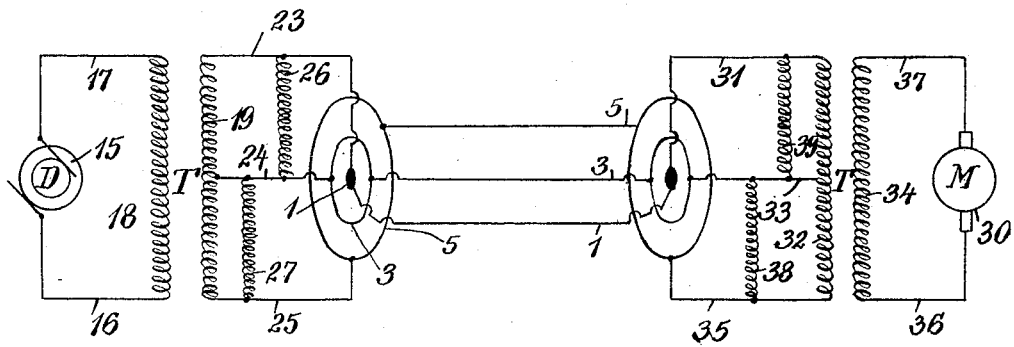
Fig. 3,
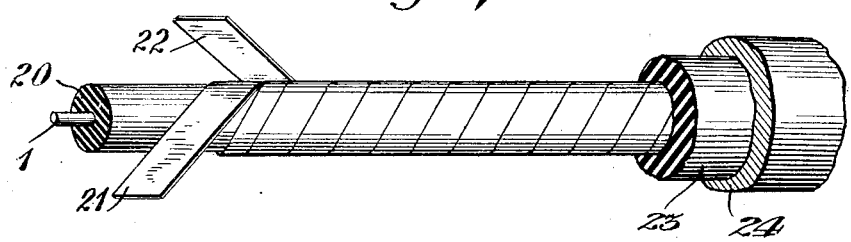
WITNESSES
Jessie B. Kay
Mary Bramidi
Albert Edgar Tanner &
Ernest Alexander Claremont
INVENTORS
BY
Duncan & Duncan
ATTORNEYS

UNITED STATES PATENT OFFICE.

ALBERT EDGAR TANNER AND ERNEST ALEXANDER CLAREMONT, OF MANCHESTER, ENGLAND.

ALTERNATING-CURRENT CABLE DISTRIBUTING SYSTEM.

1,050,250.      Specification of Letters Patent.      Patented Jan. 14, 1913.

Application filed April 8, 1910. Serial No. 554,267.

*To all whom it may concern:*

Be it known that we, ALBERT EDGAR TANNER and ERNEST ALEXANDER CLAREMONT, subjects of the King of Great Britain, and residents of Old Trafford, Manchester, county of Lancaster, England, have made certain new and useful Inventions Relating to Alternating-Current Cable Distributing Systems, of which the following is a specification, taken in connection with the accompanying drawing, which forms part of the same.

This invention relates to alternating current cable distributing systems, and relates especially to alternating current systems of distribution in which the main or inner conductor of the cable may be surrounded by one or more pressure distributing conductors embedded in the insulation to equalize the dielectric stresses therein each distributing conductor preferably having a cross-section proportional to the current carried thereby. Suitable pressure devices may be connected to said pressure distributing conductors at various distributing points along their length and the cross section of said distributing conductors may taper from said distributing points along the length of the cable. The capacity current necessary to charge the pressure distributing conductors to the required potential may be supplied by suitable self inductance or choking coils connected between successive pressure distributing conductors. Each pressure distributing conductor is preferably formed of a plurality of overlapping layers of metallic tape wound in spiral form and breaking joint with each other to give greater longitudinal conductivity.

In the accompanying drawings showing diagrammatically several illustrative embodiments of this invention, Figure 1 is a diagram showing one form of system. Fig. 2 is a similar view showing another form of distributing system; and Fig. 3 is a diagrammatic side view showing the method of winding the tapes forming one of the pressure distributing conductors.

We have discovered that in all cases the capacity current required or carried by the outer conductor (that is to say in the case of a concentric cable the outer main conductor and in the case of a single cable the outer pressure distributing conductor) will be equal to the sum of the capacity currents carried respectively by all the other conductors (including both the inner main conductor and pressure distributing conductors); and further that the capacity current carried by each of these latter will if the pressure distributing conductors be evenly spaced throughout the dielectric at distances equal to the radius of the inner conductor be equal to one another. For example in the case of a concentric cable if the pressure distributing conductors are spaced evenly throughout the dielectric at distances equal to the radius of the inner conductor then if the capacity current in the inner conductor is $(a)$ the capacity current in each pressure distributing conductor will also be $(a)$ and if there are $(n)$ such conductors the capacity current carried by the outer conductor will be $(n+1) a$.

Under such conditions we preferably make the sectional area of each cylindrical pressure distributing conductor equal, that is the thickness of each cylindrical sheet will be inversely proportional to its mean diameter and we make the sectional area of the copper in the inner and outer or main conductors sufficient to carry the effective current including the working current and the capacity currents referred to. Thus if $C$ be the working current which is in phase with the electromotive force of the line and if in addition there is a wattless inductive current $b$ due to motors or the like connected to the line the current carrying capacity of the inner conductor must be such that it will carry an effective current equal to $$\sqrt{C^2 + (a-b)^2}$$

and the current carrying capacity of the outer conductor must be such that it will carry an effective current equal to $$\sqrt{C^2 + (\overline{n+1 \cdot a - b})^2}$$

The capacity current flowing in the pressure distributing conductors varies from point to point along the cable being (except in the case of very long lines or those operating at high frequencies) at the maximum near to the pressure distributing device and diminishing to zero toward the far end; or where more than one pressure distributing device is used diminishing to zero between successive distributing devices. We therefore taper or grade the section of the pressure distributing conductors along the length of the cable so that the cross section of copper varies therein proportionately to the capacity current to be carried.

The necessary capacity current may be advantageously supplied to the pressure distributing conductors at a number of points along the length of the cable which minimizes the current carried at any point and thus correspondingly reduces the amount of conducting material in such conductors. For example we may connect the pressure distributing conductors to suitable pressure distributing devices at both ends of the cable whereby the section of such conductors therein for a length of cable is reduced to one quarter of the amount required when connection is only made at one end. On long lines we may employ in addition or otherwise pressure distributing devices connected to the pressure distributing conductors at intermediate points and if we use ($n$) such devices the section of the pressure distributing conductors for a given length is in general $$\left(\frac{1}{2(n-1)}\right)^2$$

of that necessary where only one is used.

In certain cases we use choking coils between the main conductors and the pressure distributing conductors so proportioned that when under the prescribed alternating pressure between successive pressure distributing conductors they provide the capacity current required to be fed into the pressure distributing conductors which current then does not have to be provided by the pressure distributing device or transmitted over the whole length of the line as the case may be.

In the illustrative system indicated diagrammatically in Fig. 1 the cable may comprise the central core or main conductor 1 and the outer conductor 5 which may serve as a working conductor and may also comprise a pressure distributing conductor 3, all of which may be embedded in suitable high insulating material. The generator 15 of any type may have its leads 16, 17 connected to the transformer primary 18. The secondary coil 19 of this transformer may have its leads 23, 25 connected with the cable conductors 1 and 5, respectively and a suitable connection 24 may connect the pressure distributing conductor 3 with the desired intermediate point of the transformer winding 19. At the distributing end of the cable 1 and 5 may be connected by the leads 31, 35 with the primary transformer winding 32 indicated. The secondary winding 34 of this transformer is indicated as being connected by the leads 36, 37 with any suitable device to be operated such as the motor 36. The pressure distributing conductors of the cable may also be supplied with current at a number of distributing points. For instance besides the connection at the transmitting station the pressure distributing conductor 3 of the cable may be connected by the wire 33 with any suitable pressure distributing device at the receiving station such for instance as the desired intermediate part of the transformer winding 32. Pressure distributing points may also be provided intermediate the ends of the cable as for example by interposing suitable auto transformer coils 11 and 13 between the pressure distributing conductor and the working conductors of the cable so as to supply the required pressure distributing current at any desired number of points along the pressure distributing conductor which correspondinly reduces its required cross section.

Fig. 2 illustrates diagrammatically a similar system to that shown in Fig. 1 where choking coils are used to supply the working current necessary to charge the pressure distributing conductors to the determined pressure. 1 is the central core or main conductor of the cable. 5 is the outer pressure distributing layer of the outer working conductor of a concentric cable. 3 is one of the pressure distributing conductors embedded in the insulating material. The generator 15 of any type may have its leads 16 17 connected to the transformer primary 18 the secondary coil 19 of this transformer may have its leads 23, 25 connected with the cable conductors 1 and 5 respectively and a suitable connection 24 may connect the pressure distributer 3 with the desired intermediate point of the transformer winding 19. At the receiving end of the cable conductors 1 and 5 may be connected by the leads 31, 35 with the primary transformer winding 32 indicated. The secondary winding 34 of this transformer is indicated as being connected by leads 36, 37 with any suitable device to be operated such as the motor 30. The pressure distributing conductor 3 is connected by the lead 33 with the corresponding intermediate point of the transformer coil 32. At the transmitting end the lead 23 and 24 and again 24 and 25 and at the receiving end the lead 31, 33 and again 33 35 are connected together through choking coils 26, 27 and 38, 39 so proportioned that under the alternating pressure of the periodicity existing between the terminals in such choking coils and alternating current will pass through such choking coils which is equal to the capacity or condenser current passing in the inner core distributing layer and outer conductor of the cable respectively and which is in opposite phase to such condenser current so that the windings of the transformers 19 and 32 respectively do not have to carry such current which passes backward and forward between the cable and the choking coil. It will be understood that such choking coil may be provided at intermediate points on the cable where the pressure is already determined by a pressure distributing device for the purposes of avoiding the necessity for a flow of current between the point where it is fixed and the pressure distributing device.

A suitable way of forming the pressure distributing conductors in the cable is diagrammatically indicated in Fig. 3 in which 1 is the inner conductor or core of the cable embedded in insulation 20. The pressure distributing conductor may as indicated be made up of a plurality of layers or tape or thin strips of metal such as copper or aluminium overlapping and preferably breaking joint in any desired way. As indicated the tapes 21, 22 may be spirally wound around the cable preferably overlapping so that the adjacent layers of tape break joint and have the mid portions of one tape opposite the edges of the tape in the contacting layers and thus promote the longitudinal conductivity of the concentric pressure distributing conductor thus formed. Another layer of insulation 23 may be used outside the pressure distributing conductors or tapes 21 and 22 and this insulating layer may be of substantially the same radial thickness as the inner insulating layer. In the case of the single cable illustrated the outer pressure distributing conductor 24 may be of any desired character, such for instance, as the lead or other metallic sheathing of the cable. The pressure distributing conductors may be conveniently formed of tapering cross-section by building them up out of tapes whose cross-section gradually tapers if desired. Or the desired tapering of the pressure distributing conductors from any pressure distributing point therein may be secured by substituting at the desired point a somewhat thinner tape for one of the tapes previously used and thus effect a sufficiently gradual tapering of the compound pressure distributing conductor.

Having described this invention in connection with a number of illustrative embodiments forms proportions materials and arrangements of devices and parts to the details of which disclosure the invention is not of course to be limited what is claimed as new and what is desired to be secured by Letters Patent is set forth in the appended claims:—

1. The alternating current system of electric distribution comprising cables each provided with an inner conductor and with a plurality of surrounding pressure distributing conductors one or more of which are embedded in the insulation, such pressure distributing conductors each comprising a plurality of layers of spirally wound metallic tape overlapping one another to promote their longitudinal conductivity and a reactive pressure distributing device connected to said pressure distributing conductors to maintain capacity currents in said conductors while the working current throughout the main conductors remains substantially normal in amount.

2. The alternating current system of electric distribution comprising cables each provided with an inner conductor and with a plurality of surrounding pressure distributing conductors one or more of which are embedded in the insulation, said conductors being substantially evenly spaced at distances apart substantially equal to the radius of the inner conductor, each of the said pressure distributing conductors which is within the outer conductor of a cable being of substantially equal cross section at any point in the cable and a pressure distributing device connected to said pressure distributing conductors.

3. The alternating current system of electric distribution comprising cables each provided with an inner conductor and with a plurality of surrounding pressure distributing conductors one or more of which are embedded in the insulation and the effective area of the outer distributing conductor being substantially such that its current carrying capacity is equal to the sum of the capacity currents carried by the main conductor and the other pressure distributing conductors within and a pressure distributing device connected to said pressure distributing conductors.

4. The alternating current system of electric distribution comprising cables each provided with an inner conductor and with a plurality of surrounding pressure distributing conductors one or more of which are embedded in the insulation and connected to pressure distributing devices, the cross section of such pressure distributing conductors tapering from the points where connection is made to pressure distributing devices.

5. The alternating current system of electric distribution comprising cables each provided with an inner conductor and with a plurality of surrounding pressure distributing conductors one or more of which are embedded in the insulation and pressure distributing devices connected to such pressure distributing conductors at a number of distributing points along the length of each cable to supply the capacity currents in said conductors with a minimum section of conductor in the pressure distributing conductors.

6. The alternating current system of electric distribution comprising cables each provided with an inner conductor and with a plurality of surrounding pressure distributing conductors one or more of which are embedded in the insulation connected to pressure distributing devices and having choking coils connected thereto to maintain capacity currents in said conductors while the working current throughout the main conductors remains substantially normal in amount.

7. The alternating current system of electric distribution comprising cables each provided with an inner conductor and with a plurality of surrounding pressure distributing conductors one or more of which are embedded in the insulation, said conductors being substantially evenly spaced at distances apart substantially equal to the radius of the inner conductor, each of the said pressure distributing conductors which is within the outer conductor of a cable being of substantially equal cross section at any point in the cable, pressure distributing devices connected at one or more distributing points to said pressure distributing conductors and the cross section of the pressure distributing conductors tapering from such distributing points.

8. The alternating current system of electric distribution comprising cables each provided with an inner conductor and with a plurality of surrounding pressure distributing conductors one or more of which are embedded in the insulation, said conductors being substantially evenly spaced at distances apart substantially equal to the radius of the inner conductor, each of the said pressure distributing conductors which is within the outer conductor of a cable being of substantially equal cross section at any point in the cable and pressure distributing devices connected to said pressure distributing conductors at a number of distributing points along the length of the cable.

9. The alternating current system of electric distribution comprising cables each provided with an inner conductor and with a plurality of surrounding pressure distributing conductors one or more of which are embedded in the insulation, said conductors being substantially evenly spaced at distances apart substantially equal to the radius of the inner conductor, each of said pressure distributing conductors which is within the outer conductor of a cable being of substantially equal cross section at any point in the cable, and a pressure distributing device, and choking coils connected to the main conductor and the successive distributing conductors to supply the capacity currents in said conductors without substantially increasing the working current throughout the main conductors.

10. The alternating current system of electric distribution comprising cables each provided with an inner conductor and with a plurality of surrounding pressure distributing conductors one or more of which are to a pressure distributing device and to a pressure distributing devices at a number of distributing points along the length of such cable, the cross section of the said pressure distributing conductors tapering from such distributing points.

11. The alternating current system of electric distribution comprising cables each provided with an inner conductor and with a plurality of surrounding pressure distributing conductors one or more of which are embedded in the insulation and connected to a pressure distributing device and to a choking coil connected at the pressure distributing point, the cross section of said pressure distributing conductors tapering from such distributing point.

12. The alternating current system of electric distribution comprising cables each provided with an inner conductor and with a plurality of surrounding pressure distributing conductors one or more of which are embedded in the insulation and pressure distributing devices connected to said pressure distributing conductors at a number of distributing points along the length of the cable, there being choking coils connected to such pressure distributing conductors at such pressure distributing points to supply the capacity currents in said conductors without substantially increasing the working current throughout the main conductors.

13. The alternating current system of electric distribution comprising cables each provided with an inner conductor and with a plurality of surrounding pressure distributing conductors one or more of which are embedded in the insulation, said conductors being substantially evenly spaced at distances apart substantially equal to the radius of the inner conductor, each of said pressure distributing conductors which is within the outer conductor of a cable being of substantially equal cross section at any point in the cable, pressure distributing devices connected to said pressure distributing conductors at a number of distributing points along the length of the cable and the cross section of the said pressure distributing conductors decreasing from each distributing point therein.

14. The alternating current system of electric distribution comprising cables each provided with an inner conductor and with a plurality of surrounding pressure distributing conductors one or more of which are embedded in the insulation, such pressure distributing conductors each comprising a plurality of layers of spirally wound metal tape breaking joint to promote their longitudinal conductivity, pressure distributing devices connected to such pressure distributing conductors at a number of distributing points including the transmitting and receiving end and one or more intermediate points along the cable, the cross section of such pressure distributing conductors being reduced from each distributing point therein and the cross section of the main conductors and each of the pressure distributing conductors being in proportion to the current to be carried thereby.

15. The alternating current system of electric distribution comprising cables each provided with an inner conductor and with a plurality of surrounding pressure distributing conductors one or more of which are embedded in the insulation and pressure distributing devices connected to such pressure distributing conductors at a number of distributing points including one or more intermediate points along the length of each cable to maintain capacity currents in said conductors while the working current throughout the main conductors remains substantially normal in amount.

ALBERT EDGAR TANNER.
ERNEST ALEXANDER CLAREMONT.

Witnesses:
CHARLES AMOS NEALE,
JOHN ARTHUR FURLONG.

Copies of this patent may be obtained for five cents each, by addressing the "Commissioner of Patents, Washington, D. C."

It is hereby certified that in Letters Patent No. 1,050,250, granted January 14, 1913, upon the application of Albert Edgar Tanner and Ernest Alexander Claremont, of Manchester, England, for an improvement in "Alternating-Current Cable Distributing Systems," an error appears in the printed specification requiring correction as follows: Page 1, line 97, formula, for $\sqrt{C + (n+1.\ a-b)^2}$ read $\sqrt{C^2 + (n+1.\ a-b)^2}$; and that the proper corrections have been made in the files and records of the Patent Office and are hereby made in the said Letters Patent.

Signed and sealed this 20th day of May, A. D. 1913.

[SEAL.]

C. C. BILLINGS,

*Acting Commissioner of Patents.*